US012683087B2

(12) United States Patent
Takatani

(10) Patent No.: US 12,683,087 B2
(45) Date of Patent: Jul. 14, 2026

(54) ELECTROLYTIC CAPACITOR HAVING A HIGH CAPACITANCE AND A LOW EQUIVALENT SERIES RESISTANCE AND METHOD FOR PRODUCING THE SAME

(71) Applicant: Panasonic Intellectual Property Management Co., Ltd., Osaka (JP)

(72) Inventor: Kazuhiro Takatani, Hyogo Ken (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 68 days.

(21) Appl. No.: 18/575,226

(22) PCT Filed: Jun. 29, 2022

(86) PCT No.: PCT/JP2022/026050

§ 371 (c)(1),
(2) Date: Dec. 28, 2023

(87) PCT Pub. No.: WO2023/277090

PCT Pub. Date: Jan. 5, 2023

(65) Prior Publication Data

US 2024/0290548 A1      Aug. 29, 2024

(30) Foreign Application Priority Data

Jun. 30, 2021      (JP) ................................. 2021-109454

(51) Int. Cl.
H01G 9/028      (2006.01)
H01G 9/00      (2006.01)
(Continued)

(52) U.S. Cl.
CPC ........... *H01G 9/028* (2013.01); *H01G 9/0036* (2013.01); *H01G 9/035* (2013.01); *H01G 9/07* (2013.01)

(58) Field of Classification Search
None
See application file for complete search history.

(56) References Cited

U.S. PATENT DOCUMENTS 5,130,886 A * 7/1992 Kishimoto ............. H01G 9/025
                                                                              252/500
2013/0115368 A1* 5/2013 Miyachi ................. H01G 9/028
                                                                              205/198
(Continued)

FOREIGN PATENT DOCUMENTS

JP        2014-067949 A      4/2014
WO        2014/155420 A1      10/2014
(Continued)

OTHER PUBLICATIONS

International Search Report issued in International Application No. PCT/JP2022/026050, dated Sep. 20, 2022 w/ English Translation.

*Primary Examiner* — Eric W Thomas
(74) *Attorney, Agent, or Firm* — Rimon P.C.

(57) ABSTRACT

An electrolytic capacitor includes a capacitor element. The capacitor element includes an anode body having a dielectric layer at a surface of the anode body, and an electrolyte covering part of the dielectric layer. The electrolyte contains a conjugated polymer, a polymer dopant having an anionic group, and a metal ion. The amount of the metal ion is less than 1 equivalent, relative to 1 equivalent of the anionic group.

11 Claims, 2 Drawing Sheets

(51) Int. Cl.
    H01G 9/035     (2006.01)
    H01G 9/07     (2006.01)

(56)             References Cited

U.S. PATENT DOCUMENTS

| | | |
|---|---|---|
| 2015/0187504 A1 | 7/2015 | Takatani et al. |
| 2016/0012973 A1 | 1/2016 | Takatani et al. |
| 2019/0287729 A1 | 9/2019 | Fukui et al. |
| 2020/0082994 A1* | 3/2020 | Fukui .................... H01G 9/028 |
| 2021/0142952 A1 | 5/2021 | Sato et al. |
| 2022/0084756 A1 | 3/2022 | Fukui |

FOREIGN PATENT DOCUMENTS

| | | |
|---|---|---|
| WO | 2014/155422 A1 | 10/2014 |
| WO | 2018/123255 A1 | 7/2018 |
| WO | 2020/017530 A1 | 1/2020 |
| WO | 2020/153242 A1 | 7/2020 |

* cited by examiner

ELECTROLYTIC CAPACITOR HAVING A HIGH CAPACITANCE AND A LOW EQUIVALENT SERIES RESISTANCE AND METHOD FOR PRODUCING THE SAME

CROSS-REFERENCE TO RELATED APPLICATIONS

This application is the U.S. National Phase under 35 U.S.C. § 371 of International Application No. PCT/JP2022/026050, filed on Jun. 29, 2022, which claims the benefit of foreign priority to Japanese Patent Application No. 2021-109454 filed on Jun. 30, 2021, the entire contents of each of which are hereby incorporated by reference.

TECHNICAL FIELD

The present disclosure relates to an electrolytic capacitor and a method for producing the same.

BACKGROUND ART

As a small-size capacitor having a high capacitance and a low ESR (equivalent series resistance), an electrolytic capacitor including an anode body having a dielectric layer at its surface, and a solid electrolyte layer covering at least part of the dielectric layer is seen as promising. The solid electrolyte layer usually includes a conductive polymer containing a conjugated polymer and a dopant. The solid electrolyte layer is formed using, for example, a liquid dispersion containing a conductive polymer. In the liquid dispersion, in general, a polymer-type polyanion, such as polystyrenesulfonic acid, is widely used as a dopant.

Patent Literature 1 proposes a conductive polymer fine particle dispersion including a solvent mainly composed of water, and fine particles of a polythiophene dispersed in the solvent. The polythiophene includes at least one selected from thiophenes and derivatives thereof as a polymer unit, and contains a polyanion as a dopant. The pH of the dispersion is 3 or more, and the concentration of iron contained in an iron compound insoluble in the solvent is 450 ppm or less.

Patent Literature 2 proposes producing a dispersion for forming a solid electrolyte layer by a method including: a step of dispersing thiophenes as a monomer and a polyanion as a dopant, in a solvent mainly composed of water, to prepare a liquid dispersion; and a step of mixing the liquid dispersion with an oxidizing agent, to oxidatively polymerize the monomer, thereby to prepare a dispersion of conductive polythiophene fine particles doped with a polyanion. Patent Literature 2 proposes using, as the polyanion, a polystyrenesulfonic acid which exhibits a hue when the polyanion is dissolved in water at a concentration of 2% of 10 or more and 1000 or less in Hazen color number measured by the APHA method.

CITATION LIST

Patent Literature

Patent Literature 1: International Publication WO2014/155420

Patent Literature 2: International Publication WO2014/155422

SUMMARY OF INVENTION

Technical Problem

A polymer dopant, such as polystyrenesulfonic acid, is highly effective in improving the conductivity of a conductive polymer, and is advantageous in suppressing the ESR of the electrolytic capacitor low. On the other hand, due to its high molecular weight, a polymer dopant is difficult to be impregnated into fine recesses of the dielectric layer. In the electrolytic capacitor, achieving a higher capacitance is possible if the coverage of the dielectric layer with a conductive polymer can be improved.

Solution to Problem

One aspect of the present disclosure relates to an electrolytic capacitor, including a capacitor element, wherein
  the capacitor element includes an anode body having a dielectric layer at a surface of the anode body, and an electrolyte covering part of the dielectric layer,
  the electrolyte contains a conjugated polymer, a polymer dopant having an anionic group, and a metal ion,
  an amount of the metal ion is less than 1 equivalent, relative to 1 equivalent of the anionic group.
Another aspect of the present disclosure relates to a method for producing an electrolytic capacitor including a capacitor element that includes an anode body having a dielectric layer on a surface of the anode body, and an electrolyte covering part of the dielectric layer, the method including:
  a step of preparing a liquid mixture containing a conjugated polymer, a first polymer dopant having an anionic group, and a metal ion; and
  a step of applying the liquid mixture onto the anode body, to form the electrolyte, wherein
  the step of preparing a liquid mixture includes
  a sub-step of polymerizing a precursor of the conjugated polymer in a presence of the first polymer dopant and an oxidizing agent, to obtain a first mixture containing the conjugated polymer and the first polymer dopant, and
  a sub-step of further mixing the metal ion with the first mixture, to prepare the liquid mixture as a second mixture.

Advantageous Effects of Invention

It is possible to provide an electrolytic capacitor having a high capacitance in which the ESR is suppressed low.

While the novel features of the invention are set forth particularly in the appended claims, the invention, both as to organization and content, will be better understood and appreciated, along with other objects and features thereof, from the following detailed description taken in conjunction with the drawings.

DESCRIPTION OF EMBODIMENTS

Figure 1:
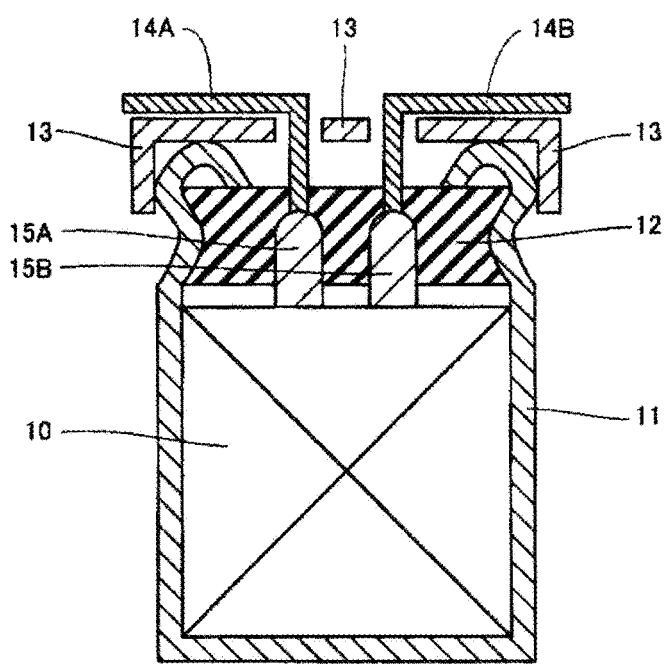
FIG. 1 A schematic cross-sectional view of an electrolytic capacitor according to one embodiment of the present disclosure.

Embodiments of an electrolytic capacitor according to the present disclosure will be described below by way of examples, but the present disclosure is not limited to the examples described below. In the following description, specific numerical values and materials are exemplified in some cases, but other numerical values and other materials may be adopted as long as the effects of the present disclosure can be obtained. In the present specification, the phrase "a numerical value A to a numerical value B" means to include the numerical value A and the numerical value B, and can be rephrased as "a numerical value A or more and a numerical value B or less." In the following description, when the lower and upper limits of numerical values related to specific physical properties, conditions, etc. are mentioned as examples, any one of the mentioned lower limits and any one of the mentioned upper limits can be combined in any combination as long as the lower limit is not equal to or more than the upper limit. When a plurality of materials are mentioned as examples, one kind of them may be selected and used singly, or two or more kinds of them may be used in combination.

The present disclosure encompasses a combination of matters recited in any two or more claims selected from plural claims in the appended claims. In other words, as long as no technical contradiction arises, matters recited in any two or more claims selected from plural claims in the appended claims can be combined.

The "electrolytic capacitor" may be rephrased as a "solid electrolytic capacitor," and the "capacitor" may be rephrased as a "condenser."

It has been revealed that, in forming an electrolyte of an electrolytic capacitor using a liquid mixture containing a conductive polymer including a conjugated polymer and a polymer dopant, when the liquid mixture contains a metal ion, there is a case where the capacitor performance improves.

The conductive polymer contained in the liquid mixture used for forming the electrolyte is formed by polymerizing a precursor of a conjugated polymer in the presence of a polymer dopant. On the other hand, a metal ion is added to the conductive polymer in the form of a salt of a polymer dopant and a metal ion. Therefore, the amount of the metal ion is small, as compared to the amount of the whole polymer dopant contained in the liquid mixture. More specifically, the amount of the metal ion is less than 1 equivalent, relative to 1 equivalent of the anionic group of the polymer dopant. In the electrolytic capacitor containing an electrolyte in such a state, the ESR can be suppressed low, and a high capacitance can be obtained. This is presumably because when the liquid mixture contains an appropriate amount of the metal ion, it becomes easier for the liquid mixture to permeate into fine recesses of the dielectric layer, and the coverage of the dielectric layer with the conductive polymer increases, leading to an increased capacitance, and thus to a lower tan δ. Furthermore, presumably because of the inclusion of a large amount of the anionic group in the polymer dopant, high conductivity of the conductive polymer can be obtained, and the ESR of the electrolytic capacitor can be suppressed low.

It is also possible to perform polymerization of the precursor using a salt of a polymer dopant and a metal ion. However, when a conductive polymer obtained by polymerization in the presence of a salt is used, although the coverage of the dielectric layer with the conductive polymer increases, the ESR tends to increase. When the polymer dopant is used in the form of a salt, the amount of the metal ion can become more than 1 equivalent, relative to 1 equivalent of the anionic group of the polymer dopant.

Presumably as a result of the increase in the amount of the metal ion, the conductivity of the electrolyte is reduced, and the ESR increases.

In the following, the electrolytic capacitor will be more specifically described.

[Electrolytic Capacitor]

(Capacitor Element)

A capacitor element included in the electrolytic capacitor includes at least an anode body having a dielectric layer at its surface, and an electrolyte covering part of the dielectric layer.

(Anode Body)

The anode body can include a valve metal, an alloy containing a valve metal, a compound containing a valve metal, and the like. These materials can be used singly, or in combination of two or more. As the valve metal, for example, aluminum, tantalum, niobium, and titanium are preferably used. The anode body having a porous surface can be obtained by, for example, roughening a surface of a base material (e.g., foil-like or plate-like base material) containing a valve metal, by etching or other methods. The anode body may be a molded body of valve metal-containing particles or a sintered body thereof. The sintered body has a porous structure.

(Dielectric Layer)

The dielectric layer is formed by anodizing the valve metal at the surface of the anode body by chemical conversion treatment or the like. It suffices when the dielectric layer is formed so as to cover at least part of the anode body. The dielectric layer is usually formed at the surface of the anode body. Since the dielectric layer is formed at the porous surface of the anode body, it is formed along the inner walls of the pores and the recesses (pits) of the surface of the anode body.

The dielectric layer contains an oxide of the valve metal. For example, when tantalum is used as the valve metal, the dielectric layer contains $Ta_2O_5$, and when aluminum is used as the valve metal, the dielectric layer contains $Al_2O_3$. The dielectric layer is not limited thereto, and may be any one that functions as a dielectric. When the surface of the anode body is porous, the dielectric layer is formed along the surface of the anode body (including the inner walls of the pores).

(Electrolyte)

The electrolyte includes a conjugated polymer, a polymer dopant having an anionic group, and a metal ion. In the electrolyte, the conjugated polymer and the polymer dopant constitute a conductive polymer, imparting high conductivity to the electrolyte. The electrolyte attached to the surface of the dielectric layer may form a layer. Such an electrolyte layer is sometimes called a solid electrolyte layer or a conductive polymer layer. The electrolyte constitutes at least part of a cathode body in the electrolytic capacitor.

(Conjugated Polymer)

As the conjugated polymer, a known conjugated polymer used in electrolytic capacitors, such as a x-conjugated polymer, can be used. Examples of the conjugated polymer include polymers whose backbones are polypyrrole, polythiophene, polyaniline, polyfuran, polyacetylene, polyphenylene, polyphenylene vinylene, polyacene, and polythiophene vinylene. It suffices when the above polymers contain at least one kind of monomer unit constituting the backbone. The above polymers include a homopolymer, a copolymer of two or more kinds of monomers, and derivatives thereof (e.g., substituted products having a substituent). For example, polythiophene includes poly(3,4-ethylenedioxythiophene) and the like.

The conjugated polymer may be used singly, or in combination of two or more kinds.

The weight average molecular weight (Mw) of the conjugated polymer is not particularly limited, but is, for example, 1,000 or more and 1,000,000 or less.

In the present specification, the weight average molecular weight (Mw) is a value in terms of polystyrene as measured by gel permeation chromatography (GPC). In GPC, measurement is usually made using a polystyrene gel column, and water/methanol (volume ratio: 8/2) as a mobile phase.

(Dopant)

As the dopant, a polymer dopant (first dopant) having an anionic group is used. When the first dopant is used, dedoping from the conjugated polymer is unlikely to occur, the ESR is likely to be suppressed low, and excellent capacitor performance can be stably obtained. The electrolyte may include, as necessary, a second dopant other than the first dopant. As the second dopant, an anion with a relatively low-molecular weight is exemplified.

The first dopant may be, for example, a polymer having a plurality of anionic groups. Examples of such a polymer include those containing a monomer unit having an anionic group. Examples of the anionic group include a sulfonic acid group, and a carboxyl group. The first dopant may have one kind of anionic group, or may have two or more kinds of anionic groups.

In the electrolyte, the anionic group of the first dopant may be included in the electrolyte in the form of at least one selected from the group consisting of an acid (e.g., in the sulfonic acid group, —SO$_3$H), an anion (e.g., in the sulfonic acid group, —SO$_3^-$), and a salt. The form of a salt encompasses a form in which the anionic group and the metal ion are forming a salt. The anionic group may form a salt with a cation present near the electrolyte, in the electrolytic capacitor. Such a salt is also encompassed in the above form of a salt. The anionic group of the first dopant may be included in the electrolyte in the form bound to or interacting with the conjugated polymer. In the present specification, all these forms are sometimes simply referred to as an "anionic group", "sulfonic acid group", "carboxyl group", or the like.

Specific examples of the first dopant having a carboxyl group are polyacrylic acid, polymethacrylic acid, and a copolymer including at least one of acrylic acid and methacrylic acid. The first dopant having a sulfonic acid group is, for example, a polymer-type polysulfonic acid. Specific examples of the first dopant having a sulfonic acid group are polyvinylsulfonic acid, polystyrenesulfonic acid (including copolymers, substituted products having a substituent, etc.), polyallylsulfonic acid, polyacrylsulfonic acid, polymethacrylsulfonic acid, poly(2-acrylamido-2-methylpropanesulfonic acid), polyisoprene sulfonic acid, polyester sulfonic acid (aromatic polyester sulfonic acid, etc.), and phenolsulfonic acid novolac resin. These are merely examples, and the first dopant is not limited thereto.

Examples of the second dopant are sulfate, nitrate, phosphate, borate, organic sulfonate, and carboxylate ions. Compounds (e.g., acids, salts, etc.) that can generate these ions may be used. For example, the compounds that generate sulfonate ions include aromatic sulfonic acids (p-toluenesulfonic acid, naphthalenesulfonic acid, etc.). However, these are merely examples, and the second dopant is not limited to these examples.

The amount of the first dopant contained in the electrolyte is, for example, 10 to 1000 parts by mass, and may be 20 to 500 parts by mass or 50 to 200 parts by mass, relative to 100 parts by mass of the conjugated polymer.

The amount of the second dopant contained in the electrolyte is, for example, 10 parts by mass or less, and may be 5 parts by mass or less, relative to 100 parts by mass of the conjugated polymer. The amount of the second dopant contained in the electrolyte may be 1 part by mass or more, relative to 100 parts by mass of the conjugated polymer.

(Metal Ion)

In the electrolyte, when the metal ion is present in an undissociated state, usually, part of the first dopant is forming a salt with the metal ion. For example, when the electrolytic capacitor does not contain a liquid component, the metal ion is usually contained in the form of a salt with the anionic group of the first dopant. When the second dopant is contained in the electrolyte, the metal ion may be contained in the form of a salt with the anionic group of the second dopant. When the electrolytic capacitor does not contain a liquid component, part of the metal ion may be contained in the electrolyte in the form of a salt with an anion present near the electrolyte.

The amount of the metal ion is less than 1 equivalent, relative to 1 equivalent of the anionic group of the first dopant. When the electrolyte contains such an amount of metal ion, the ESR can be suppressed low, while excellent impregnation is ensured of a liquid mixture, which is used to form the electrolyte, into fine recesses of the dielectric layer. Furthermore, in the case of using a separator, the permeability of the liquid mixture into the separator is considered to be enhanced. When the impregnation of the liquid mixture is excellent, the coverage of the electrolyte onto the dielectric layer is improved. Therefore, a high capacitance can be obtained, and the tan δ can be suppressed low. The amount of the metal ion relative to 1 equivalent of the anionic group of the first dopant is, for example, 0.001 equivalents or more and less than 1 equivalent. In view of the ease of obtaining a higher capacitance, the amount of the metal ion relative to 1 equivalent of the anionic group of the first dopant is preferably 0.005 equivalents or more and 0.95 equivalents or less, more preferably 0.01 equivalents or more (or 0.05 equivalents or more) and 0.95 equivalents or more, further preferably 0.1 equivalents or more and 0.9 equivalents or less, particularly preferably 0.3 equivalents or more and 0.5 equivalents or less. Among these ranges, in view of obtaining a lower ESR, the amount of the metal ion is preferably 0.9 equivalents or less, more preferably 0.5 equivalents or less.

As the metal ion, an alkali metal ion is preferable. This is because alkali metal ions are highly effective in improving the impregnation of the liquid mixture, and undesired side reactions rarely occur within the electrolytic capacitor. As the alkali metal ion, lithium ion, sodium ion, or potassium ion is preferable. The electrolyte may contain one kind of metal ion, or a combination of two or more kinds of metal ions. At least lithium ion may be used. Lithium ion may be combined with at least one of sodium ion and potassium ion, as necessary.

The amount (equivalent) of the metal ion relative to 1 equivalent of the anionic group in the electrolyte can be determined by the following procedure. From an electrolytic capacitor, the capacitor element is taken out and disassembled, and the electrolyte is scraped therefrom, to use it as a sample. When a liquid component is included, the liquid component is removed using equipment such as a centrifuge machine. The obtained sample is analyzed using a technique, such as ion chromatography, capillary electrophoresis, and ICP (inductively coupled plasma) emission spectrometry, to identify the kinds of the dopant and the metal ion. Part of the sample is taken out, and weighed accurately, to determine the contents of the dopant and the metal ion. From the obtained contents and the number of anionic groups in the dopant, the amount (equivalent) of the metal ion relative to 1 equivalent of the anionic group is determined.

(Second Cation)

The electrolyte may contain a cation (second cation) other than the metal ion (first cation). When the second cation is present in an undissociated state in the electrolyte, the second cation is usually forming a salt with an anion present near the electrolyte. For example, when the electrolytic capacitor does not contain a liquid component, the second cation may form a salt with the anionic group of the first dopant, may form a salt with the anionic group of the second dopant, and may form a salt with an anion other than these.

As the second cation, an inorganic cation, such as ammonium ion, and an organic cation derived from a nitrogen-containing compound are exemplified. The nitrogen-containing compound corresponding to the organic cation include, for example, amines (primary to tertiary amines, etc.), quaternary ammonium compounds (amidine compounds (including imidazole compounds), etc.), and amidinium compounds. The amines may be aliphatic, aromatic, or heterocyclic. Examples of the amines are trimethylamine, diethylamine, triethylamine, ethylenediamine, aniline, pyrrolidine, imidazole, and 4-dimethylaminopyridine.

The electrolyte may contain the second cation singly, or in combination of two or more kinds.

(Others)

The electrolyte may have the same composition throughout. The electrolyte layer may be formed so as to include a first portion on the dielectric layer side and a second portion covering the first portion. In this case, it is preferable to form the first portion, which is required to have high permeability into fine recesses, using a liquid mixture containing at least a metal ion. In such an electrolyte, a content C1 of the metal ion in the first portion and a content C2 of the metal ion in the second portion satisfy C1>C2. The second portion may not contain the metal ion. The second portion may contain neither the metal ion nor the second cation. As for the contents C1 and C2 of the metal ion, with a portion of the electrolyte filled in the recesses of the dielectric layer and a portion of the electrolyte disposed more outward than the dielectric layer defined respectively as the first portion and the second portion, measuring the distribution of the metal ion for each portion using a high-sensitivity EDS (energy dispersive X-ray spectrometer) can confirm the relationship between C1 and C2.

The electrolyte is formed by applying a liquid mixture containing a conjugated polymer, a first dopant (specifically, a first polymer dopant), and a metal ion, to an anode body having a dielectric layer. The electrolyte is formed so as to cover at least part of the dielectric layer. The liquid mixture may be a solution or a liquid dispersion. The application of the liquid mixture to the anode body may be performed once, and may be repeated twice or more times.

The liquid mixture can be prepared through, for example, a sub-step of polymerizing a precursor of the conjugated polymer in the presence of the first polymer dopant and an oxidizing agent, to obtain a first mixture containing the conjugated polymer and the first polymer dopant, and a sub-step of further mixing the metal ion with the first mixture, to prepare the liquid mixture, as a second mixture.

As long as the metal ion is contained in the liquid mixture at the time of application to the anode body having a dielectric layer, excellent impregnation can be obtained. Therefore, the metal ion may not be necessarily contained in the reaction system during polymerization of the precursor. The amount of the metal ion contained in the reaction system is preferably small so that the metal ion gives no influence on the reaction system. In the reaction system, for example, the amount of the metal ion may be 0.01 equivalents or less or 0.001 equivalents or less, relative to 1 equivalent of the anionic group of the first polymer dopant. In particular, the polymerization of the precursor is preferably performed in the absence of the metal ion.

The metal ion may be mixed in the form of a salt, with the first mixture. When the salt is dissolved in the solvent or the like and mixed in this state with the first mixture, the metal ion is dissociated in some cases. Such cases are also encompassed in being mixed in the form of a salt. For example, the metal ion may be mixed in the form of a salt of the first dopant (specifically, the second polymer dopant) and the metal ion, with the first mixture. The second polymer dopant is encompassed in the aforementioned first dopant, for which the description of the first dopant can be referred to. The second polymer dopant may be used singly, or in combination of two or more kinds. The first polymer dopant contained in the first mixture may be the same as at least part of the second polymer dopant, or may be different from all of the second polymer dopant. When the second cation is used, it may be added to the first mixture or may be added to the liquid mixture. The second cation is added in the form of a salt, as necessary. The salt may be a salt with the first dopant, a salt with the second dopant, or a salt with another anion.

The thus-obtained liquid mixture containing a metal ion may be used to form a first portion, and the liquid mixture prepared without using a metal ion (e.g., the first mixture) may be used to form a second portion. The first portion may be formed by attaching a liquid mixture once, or by attaching it twice or more. Likewise, the second portion may be formed by attaching a liquid mixture for the second portion once, or by attaching it twice or more.

When a plurality of liquid mixtures are used for forming the electrolyte, the compositions of the respective liquid mixtures (e.g., the kinds of each monomer, dopant, metal ion, second cation, etc., and the amounts of them) may be the same or different.

Examples of the precursor of a conjugated polymer used in the liquid mixture include: raw material monomers of a conjugated polymer; and oligomers and prepolymers in which a plurality of molecular chains of raw material monomers are connected. The precursor may be used singly, or in combination of two or more kinds.

The oxidizing agent may be added to the liquid mixture, or may be applied to the anode body with the dielectric layer formed at its surface, before or after bringing the liquid mixture into contact with the anode body. Examples of such an oxidizing agent include compounds capable of producing $Fe^{3+}$ (ferric sulfate, etc.), persulfates (sodium persulfate, ammonium persulfate, etc.), and hydrogen peroxide. The oxidizing agent may be used singly, or in combination of two or kinds.

The liquid mixture usually contains a solvent. Examples of the solvent include water, an organic solvent, and a mixed solvent of water and an organic solvent (water-soluble organic solvent, etc.).

In the case of using other conductive materials, additives, and the like, they may be added to the liquid mixture.

(Cathode Body)

For the cathode body, likewise for the anode body, a metal foil may be used. The metal is preferably a valve metal, such as aluminum, tantalum, and niobium, or an alloy containing a valve metal. The metal constituting the cathode body, however, is not limited thereto. A surface of the metal foil may be roughened, as necessary. The metal foil may be provided at its surface with a chemical conversion film, or with a surface film of a metal different from the metal constituting the metal foil (i.e., a dissimilar metal) or of a non-metal. Examples of the dissimilar metal and the non-metal include a metal, such as titanium, and a non-metal, such as carbon.

(Separator)

When a metal foil is used for the cathode body, a separator may be disposed between the metal foil and the anode body. As the separator, without particular limitation, for example, a nonwoven fabric including cellulose, polyethylene terephthalate, vinylon, or polyamide (e.g., aliphatic polyamide, aromatic polyamide such as aramid) fibers may be used. In the present disclosure, since the electrolyte is formed using a liquid mixture containing a metal ion, excellent impregnation of the liquid mixture into the separator can be ensured. Therefore, even when the anode body and the cathode body are stacked with the separator interposed therebetween, and the liquid mixture is applied to the stack to form an electrolyte, the electrolyte can be formed with high coverage.

(Liquid Component)

When the electrolytic capacitor contains a liquid component, this is advantageous in ensuring even higher capacitance. Furthermore, even when the electrolytic capacitor is exposed to high temperatures, the changes in ESR can be suppressed low.

The liquid component contains a solvent. In view of suppressing the volatilization of the solvent, the solvent preferably contains at least a polyhydric alcohol. In addition to the polyhydric alcohol, a sulfone compound, a lactone compound, a carbonate compound, and the like may be used. The solvent may be used singly, or in combination of two or more kinds.

Examples of the sulfone compound include sulfolane, dimethyl sulfoxide, and diethyl sulfoxide. Examples of the lactone compound include γ-butyrolactone and γ-valerolactone. Examples of the carbonate compound include dimethyl carbonate, diethyl carbonate, ethyl methyl carbonate, ethylene carbonate, propylene carbonate, and fluoroethylene carbonate.

The proportion of the polyhydric alcohol in the whole solvent contained in the liquid component is, for example, 50 mass % or more, and may be 75 mass % or more. The proportion of the polyhydric alcohol in the whole solvent contained in the liquid component is 100 mass % or less.

The polyhydric alcohol includes, for example, a glycerin compound, a sugar alcohol compound, and a glycol compound.

Examples of the glycerin compound include glycerin, a polyglycerin (diglycerin, triglycerin, etc.), or derivatives thereof. The number of repeating glycerin units in the polyglycerin is, for example, 2 or more and 20 or less, and may be 2 or more and 10 or less. Examples of the sugar alcohol compound include a sugar alcohol (erythritol, mannitol, pentaerythritol, etc.) or derivatives thereof. The derivatives are exemplified by alkylene oxide adducts (an adduct in which one alkylene oxide is added per one hydroxy group of glycerin, polyglycerin, or sugar alcohol). The alkylene oxide adducts are exemplified by $C_{2-4}$ alkylene oxide adducts (ethylene oxide adduct, etc.).

Examples of the glycol compound include an alkylene glycol ($C_{2-4}$ alkylene glycol (e.g., ethylene glycol, propylene glycol), etc.), a polyalkylene glycol (poly$C_{2-4}$ alkylene glycol (e.g., diethylene glycol, dipropylene glycol, triethylene glycol, polyethylene glycol), etc.), and a polyalkylene oxide adduct (poly$C_{2-4}$ alkylene oxide adduct (e.g., polyethylene oxide adduct), etc.) of a sugar alcohol (glycerin, erythritol, mannitol, pentaerythritol, etc.).

The solvent preferably contains, among polyhydric alcohols, any one selected from ethylene glycol, glycerin, diethylene glycol, triethylene glycol, and propylene glycol.

The liquid component may contain a solute. Examples of the solute include an acid component and a base component.

Examples of the acid component include a carboxylic acid (aliphatic carboxylic acid, aromatic carboxylic acid (including polycarboxylic acid, such as phthalic acid and pyromellitic acid), etc.), a sulfur-containing acid (sulfuric acid, sulfonic acid (e.g., aliphatic sulfonic acid, aromatic sulfonic acid), etc.), a boron-containing acid (boric acid, halogenated boric acid (e.g., tetrafluoroboric acid), or partial esters thereof, etc.), a phosphorus-containing acid (phosphoric acid, halogenated phosphoric acid (e.g., hexafluorophosphoric acid), etc.), phosphonic acid, phosphinic acid, or partial esters thereof, etc.), nitric acid, and nitrous acid. As the acid component, a condensate (borodisalicylic acid, borodiglycolic acid, borodioxalic acid, etc.) of a carboxylic acid and an inorganic acid (boric acid, phosphoric acid, etc.) may be used. The aromatic sulfonic acid includes an aromatic sulfonic acid having a hydroxyl or carboxyl group in addition to a sulfo group (oxyaromatic sulfonic acid (e.g., phenol-2-sulfonic acid), and a sulfoaromatic carboxylic acid (e.g., p-sulfobenzoic acid, 3-sulfophthalic acid, 5-sulfosalicylic acid), etc.). A polymeric acid component may also be used. The polymeric acid component can include, for example, at least one selected from the group consisting of polyacrylic acid, polymethacrylic acid, polyvinylsulfonic acid, polystyrenesulfonic acid, polyallylsulfonic acid, polyacrylsulfonic acid, polymethacrylsulfonic acid, poly(2-acrylamido-2-methylpropanesulfonic acid), and polyisoprene sulfonic acid. The liquid component may contain one kind of acid component, or two or more kinds of acid components.

Examples of the base component include ammonia, an amine (specifically, primary amine, secondary amine, and tertiary amine), a quaternary ammonium compound, and an amidinium compound. The amine may be aliphatic, aromatic, or heterocyclic. Examples of the amine include trimethylamine, diethylamine, triethylamine, ethylenediamine, aniline, pyrrolidine, imidazole, and 4-dimethylaminopyridine. Examples of the quaternary ammonium compound include an amidine compound (including an imidazole compound). The liquid component may contain one kind of base component, or two or more kinds of base components.

The liquid component may contain the acid component and the base component, each in a free state, or in the form of an ion, or in the form of a salt. The liquid component may contain an organic salt. Examples of the organic salt include those in which at least one of the acid component and the base component is organic.

The concentration of the solute in the liquid component is, for example, 0.1 mass % or more and 25 mass % or less, and may be 0.5 mass % or more and 15 mass % or less. When the concentration of the solute is in the range as above, dedoping of the dopant is likely to be suppressed.

(Others)

The electrolytic capacitor may be of a wound type, and may be of a chip type or a laminate type. The electrolytic capacitor has at least one capacitor element, and may have a plurality of capacitor elements. For example, a solid electrolytic capacitor may include a laminate of two or more capacitor elements, or may include two or more wound capacitor elements. The configuration or number of capacitor elements may be selected depending on the type or application of the electrolytic capacitor.

In the following, the electrolytic capacitor of the present disclosure will be described more specifically, based on embodiments. However, the electrolytic capacitor of the present disclosure is not limited to the following embodiments.

Figure 2:
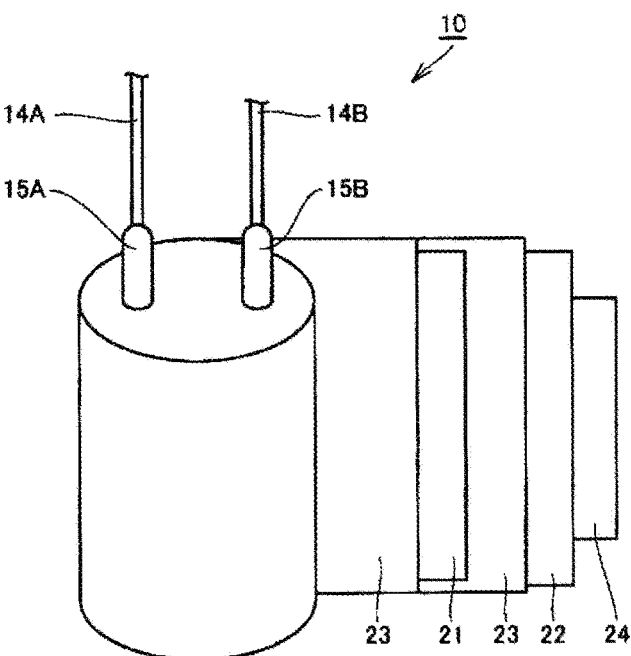
FIG. 2 A schematic illustration for explaining the configuration of the capacitor element of FIG. 1.

FIG. 1 is a schematic cross-sectional view of an electrolytic capacitor according to the present embodiment, and FIG. 2 is a partially-exploded schematic view of a capacitor element according to the electrolytic capacitor.

The electrolytic capacitor illustrated in FIG. 1 includes a capacitor element 10, a bottomed case 11 housing the capacitor element 10, an encapsulation member 12 closing an opening of the bottomed case 11, a seat plate 13 covering the encapsulation member 12, lead wires 14A and 14B each extended from the encapsulation member 12 and passing through the seat plate 13, lead tabs 15A and 15B each connecting the lead wire with an electrode of the capacitor element 10, and a liquid component (not shown). The open end of the bottomed case 11 is curled so as to be crimped onto the encapsulation member 12.

The capacitor element 10 is produced from a wound body as illustrated in FIG. 2. The wound body is a semi-finished product of the capacitor element 10, in which a conductive polymer is not yet disposed between an anode body 21 having a dielectric layer at its surface and a cathode body 22. The wound body is formed by winding the anode body 21 connected to the lead tab 15A and the cathode body 22 connected to the lead tab 15B, with a separator 23 interposed therebetween. The outermost layer of the wound body is secured with a winding stop tape 24. FIG. 2 shows a partially exploded state before the outermost layer of the wound body is secured.

The anode body 21 has a metal foil with a roughened surface, and a dielectric layer is formed at the roughened surface. The capacitor element 10 is completed by attaching a conductive polymer compound on at least part of the surface of the dielectric layer. The capacitor element 10 is housed, together with the liquid component (not shown), in a package case.

An exemplary method for producing an electrolytic capacitor will be described below.
(i) Step of Preparing Anode Body 21 Having Dielectric Layer and Cathode Body 22

As a raw material of the anode body 21 and the cathode body 22, a metal foil containing a valve metal is used. In the anode body 21, by etching treatment or the like, a surface of the metal foil is roughened and a plurality of irregularities are formed at the surface of the metal foil. This is followed by forming a dielectric layer on the roughened surface of the metal foil by chemical conversion treatment or the like. A surface of the cathode body 22 may be roughened, as necessary.
(ii) Step of Fabricating Wound Body The anode body 21 and the cathode body 22 are wound with the separator 23 interposed therebetween, to form a wound body. For the separator 23, a nonwoven fabric mainly composed of a synthetic cellulose or the like can be used. The winding stop tape 24 is placed on the outer surface of the cathode body 22 positioned at the outermost layer of the wound body, to secure the end of the cathode body 22. The wound body may be further subjected to chemical conversion treatment, as necessary.

(iii) Step of Forming Capacitor Element 10

For example, a liquid mixture prepared by the above procedures containing a conjugated polymer, a first polymer dopant, and a metal ion is impregnated into the dielectric layer, to form a film of a conductive polymer (electrolyte) that covers at least part of the dielectric layer. In this way, the capacitor element 10 in which a conductive polymer (electrolyte) is disposed between the anode body 21 and the cathode body 22 is obtained. The step of applying a liquid mixture onto the surface of the dielectric layer may be repeated twice or more. In the case of using a liquid component, after the electrolyte is formed, the liquid component is impregnated into the capacitor element 10.
(iv) Step of Encapsulating Capacitor Element The capacitor element 10 is housed, together with the liquid component, in the bottomed case 11, so that the lead wires 14A and 14B are positioned on the opening side of the bottomed case 11. Next, the opening of the bottomed case 11 is closed with the encapsulation member 12 having the lead wires 14A and 14B passing therethrough, and the open end is curled so as to be crimped onto the encapsulation member 12, and then, the seat plate 13 is placed on the curled portion. Thus, an electrolytic capacitor as illustrated in FIG. 1 is completed.

In the above embodiments, a wound electrolytic capacitor is described, but the scope of application of the present invention is not limited to the above, and can also be applied to other capacitors, for example, a chip-type electrolytic capacitor including a metal sintered body as the anode body, and a laminate-type electrolytic capacitor including a metal plate as the anode body.

All of the features described in the present specification may be combined in any combination.

EXAMPLES

The present invention will be more specifically described below with reference to Examples and Comparative Examples, but the present invention is not limited to the following Examples.
<<Fabrication of electrolytic capacitors A1 to A14 and B1 to B3>>

A wound electrolytic capacitor (diameter 10 mm×L (length) 10 mm) having a rated voltage of 25 V and a rated capacitance of 330 μF was produced. The specific production method of the electrolytic capacitor will be described below.
(Preparation of Anode Body)

A 100-μm-thick aluminum foil was subjected to etching treatment, to roughen the surface of the aluminum foil. Then, a dielectric layer was formed at the surface of the aluminum foil by chemical conversion treatment. The chemical conversion treatment was performed by immersing the aluminum foil in an ammonium adipate solution, and applying a voltage of 45 V thereto. Then, the aluminum foil was cut, to prepare an anode body.
(Preparation of Cathode Body)

A 50-μm-thick aluminum foil was subjected to etching treatment, to roughen the surface of the aluminum foil. Then, the aluminum foil was cut, to prepare a cathode body.
(Fabrication of Wound Body)

An anode lead tab and a cathode lead tab were connected to the anode body and the cathode body, respectively, and the anode body and the cathode body were wound, together with the lead tabs, with a separator interposed between the anode body and the cathode body. An anode lead wire and a cathode lead wire were respectively connected to the ends of the lead tabs extended from the wound body. The obtained wound body was subjected to chemical conversion treatment again, to form a dielectric layer on the cut end of the anode body. Next, the end of the outer surface of the wound body was secured with a winding stop tape, to complete the wound body. The separator used here was a nonwoven fabric made of cellulose.

(Preparation of liquid mixture)

A mixed solution was prepared by dissolving 3,4-ethyl-enedioxythiophene (EDOT) and polystyrenesulfonic acid (PSS, weight average molecular weight 100,000) serving as a first polymer dopant, in ion-exchanged water. To the mixed solution, under stirring, iron(III) sulfate (oxidizing agent) dissolved in ion-exchanged water was added, to allow a polymerization reaction to proceed. Upon reaction, the resultant reaction solution was dialyzed, to remove unreacted monomers and excess oxidizing agent, so that a polymer dispersion (first mixture) including polyethylene dioxythiophene doped with PSS (PEDOT/PSS) was obtained. At this time, the doping amount was adjusted so that EDOT was present in an amount of 0.5 equivalents, relative to 1 equivalent of the anionic group of PSS. In B1, instead of PSS, a lithium salt of PSS was used.

Polystyrenesulfonic acid (PSS, weight average molecular weight 100,000) serving as a second polymer dopant, and an aqueous solution of a hydroxide of a cation shown in Tables or an aqueous ammonia were added and mixed. The hydroxide or ammonia was added in such a proportion that the cation shown in Tables was present in an equivalent shown in Tables, relative to 1 equivalent of the anionic group of the polystyrenesulfonic acid, thereby to adjust the pH to about 2.0 to 3.5. In this way, a liquid mixture (second mixture) A was prepared. In B1, as the liquid component, the first mixture was used.

Polystyrenesulfonic acid (PSS, weight average molecular weight 100,000) and aqueous ammonia were added. The aqueous ammonia was added in such a proportion that ammonium ion was present in an amount of 0.2 equivalents, relative to 1 equivalent of the anionic group of the polystyrenesulfonic acid, thereby to adjust the pH to about 2.2. In this way, a liquid mixture B was prepared.

(Formation of Electrolyte Layer)

In a reduced pressure atmosphere (40 kPa), the wound body was immersed in the liquid mixture placed in a predetermined container for 5 minutes, and then, the wound body was pulled out of the liquid mixture. Next, the wound body impregnated with the liquid mixture was dried for 20 minutes in a drying oven at 150° C., to form a conductive polymer layer covering at least part of the dielectric layer. In this way, a capacitor element was formed. In A12 and A13, the wound body was immersed in the liquid mixture A for 2 minutes, and then, the wound body was pulled out of the liquid mixture and dried for 20 minutes in a drying oven at 150° C. In A12, the wound body after drying was immersed in the liquid mixture B for 3 minutes, and in A13, immersed in the first mixture for 3 minutes. In A14, the wound body was immersed in the first mixture for 2 minutes, and then, the wound body was pulled out of the first mixture and dried for 20 minutes in a drying oven at 150° C. In A14, the wound body after drying was immersed in the liquid mixture A for 3 minutes. Thereafter, the capacitor element of each Example was pulled out of the liquid mixture and dried for 20 minutes in a drying oven at 150° C. In this way, a capacitor element was formed.

(Preparation of Liquid Component)

To ethylene glycol serving as a solvent, phthalic acid serving as an acid component and triethylamine serving as a base component were added such that the respective concentrations in the liquid component were 5 mass % and 5 mass %, and mixed. In this way, a liquid component was prepared.

(Fabrication of Electrolytic Capacitor)

The above wound body with the electrolyte formed was immersed in the liquid component for 5 minutes in a reduced pressure atmosphere (40 kPa). In this way, a capacitor element impregnated with the liquid component was obtained. The obtained capacitor element was encapsulated, to complete an electrolytic capacitor as illustrated in FIG. 1. This was followed by aging treatment at 130° C. for 2 hours, under application of a rated voltage.

[Evaluation: Measurement of ESR and Capacitance]

In a 20° C. environment, the initial capacitance (µF) at a frequency of 120 Hz and the ESR at a frequency of 100 kHz of each solid electrolytic capacitor were measured using an LCR meter for four-terminal measurement. The average of the values measured for 20 solid electrolytic capacitors was determined.

The evaluation results are shown in Tables 1 and 2. In the tables, A1 to A14 are of Examples, and B1 to B3 are of Comparative Examples.

TABLE 1

| | first portion | | | | | |
| | first cation | (eq.) | second cation | (eq.) | second portion | capacitance (µF) | ESR (mΩ) |
|---|---|---|---|---|---|---|---|
| B3 | — | 0.000 | — | 0.000 | — | 240 | 30 |
| B2 | — | 0.000 | NH$_4^+$ | 0.500 | — | 300 | 20 |
| A2 | Li$^+$ | 0.005 | — | 0.000 | — | 310 | 10 |
| A3 | Li$^+$ | 0.010 | — | 0.000 | — | 312 | 10 |
| A4 | Li$^+$ | 0.050 | — | 0.000 | — | 312 | 10 |
| A5 | Li$^+$ | 0.100 | — | 0.000 | — | 315 | 10 |
| A1 | Li$^+$ | 0.300 | — | 0.000 | — | 320 | 10 |
| A6 | Li$^+$ | 0.500 | — | 0.000 | — | 320 | 11 |
| A7 | Li$^+$ | 0.900 | — | 0.000 | — | 317 | 12 |
| A8 | Li$^+$ | 0.950 | — | 0.000 | — | 310 | 14 |
| B1 | Li$^+$ | 1.000 | — | 0.000 | — | 307 | 16 |

TABLE 2

| | first portion | | | | | |
| | first cation | (eq.) | second cation | (eq.) | second portion | capacitance (µF) | ESR (mΩ) |
|---|---|---|---|---|---|---|---|
| A1 | Li$^+$ | 0.300 | — | 0.000 | — | 320 | 10 |
| A9 | Na$^+$ | 0.300 | — | 0.000 | — | 320 | 12 |
| A10 | K$^+$ | 0.300 | — | 0.000 | — | 318 | 13 |
| A11 | Li$^+$ | 0.300 | NH$_4^+$ | 0.200 | — | 315 | 12 |
| A12 | Li$^+$ | 0.300 | — | 0.000 | NH$_4^+$ (0.200 eq.) | 320 | 12 |
| A13 | Li$^+$ | 0.300 | — | 0.000 | no cation added | 318 | 9 |
| A14 | — | 0.000 | — | 0.000 | Li$^+$ (0.300 eq.) | 313 | 12 |

As shown in Table 1, when an electrolyte is formed using a liquid mixture containing a metal ion (specifically, lithium ion), the ESR decreases, and the capacitance improves (comparison of B3 with B1 and A1 to A8). When using a liquid mixture containing a metal ion, the reduction rate of ESR is low, and the increase rate of capacitance is high, as compared to when using a liquid mixture containing ammonium ion (comparison of B3 with B2 and A6). When the amount of the metal ion is 1 equivalent or more, the capacitance-increasing effect and the ESR-decreasing effect are reduced. On the other hand, when the amount of the metal ion is less than 1 equivalent, a high capacitance can be obtained, and the ESR can be suppressed low (comparison of B1 with A1 to A9).

As shown in Table 2, also when sodium ion or potassium ion is used as a metal ion, almost the same excellent effects as in the case of using lithium ion can be obtained (comparison of A1 with A9 and A10). Even in the case where the electrolyte contains ammonium ion, when further containing a metal ion, a somewhat high capacitance can be ensured, and the ESR can be suppressed relatively low (comparison of B2 and A1 with A11). In view of obtaining a higher capacitance, in the case of adding ammonium ion, it is more advantageous to add it to the second portion than to the first portion (comparison of A11 with A12). Furthermore, as for the metal ion, when a larger amount of metal ion is contained in in the first portion than in the second portion, the capacitance tends to be higher, and the ESR tends to be lower (comparison of A1 with A14).

INDUSTRIAL APPLICABILITY

The electrolytic capacitor of the present disclosure can be used in various applications that require high capacitance and low ESR. It is also suitable for use as a hybrid electrolytic capacitor. However, the uses of electrolytic capacitor is not limited thereto.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

REFERENCE SIGNS LIST

10: capacitor element
11: bottomed case
12: encapsulation member
13: seat plate
14A, 14B: lead wire
15A, 15B: lead tab
21: anode body
22: cathode body
23: separator
24: winding stop tape

The invention claimed is:

1. An electrolytic capacitor, comprising a capacitor element, wherein
the capacitor element includes an anode body having a dielectric layer at a surface of the anode body, an electrolyte covering part of the dielectric layer, and a liquid component,
the electrolyte contains a conjugated polymer, a polymer dopant having an anionic group, and a lithium ion,
an amount of the lithium ion is 0.1 equivalents or more and 0.95 equivalents or less, relative to 1 equivalent of the anionic group.

2. The electrolytic capacitor according to claim 1, wherein the anionic group of the polymer dopant is contained in the electrolyte in a form of at least one selected from the group consisting of an acid, an anion, and a salt with the lithium ion.

3. The electrolytic capacitor according to claim 1, wherein the electrolyte further contains an ammonium ion.

4. The electrolytic capacitor according to claim 1, further comprising a separator.

5. The electrolytic capacitor according to claim 1, wherein the amount of the lithium ion is 0.1 equivalents or more and 0.9 equivalents or less, relative to 1 equivalent of the anionic group.

6. The electrolytic capacitor according to claim 1, wherein the amount of the lithium ion is 0.3 equivalents or more and 0.5 equivalents or less, relative to 1 equivalent of the anionic group.

7. An electrolytic capacitor, comprising a capacitor element, wherein
the capacitor element includes an anode body having a dielectric layer at a surface of the anode body, an electrolyte covering part of the dielectric layer, and a liquid component,
the electrolyte contains a conjugated polymer, a polymer dopant having an anionic group, and a metal ion,
the electrolyte includes a first portion on the dielectric layer side, and a second portion covering at least part of the first portion, and
a content C1 of the metal ion in the first portion and a content C2 of the metal ion in the second portion satisfy C1>C2.

8. The electrolytic capacitor according to claim 7, wherein the second portion does not contain the metal ion.

9. A method for producing an electrolytic capacitor including a capacitor element that includes an anode body having a dielectric layer on a surface of the anode body, and an electrolyte covering part of the dielectric layer, the method comprising:
a step of preparing a liquid mixture containing a conjugated polymer, a first polymer dopant having an anionic group, and a lithium ion, an amount of the lithium ion being 0.1 equivalents or more and 0.95 equivalents or less, relative to 1 equivalent of the anionic group; and
a step of applying the liquid mixture onto the anode body, to form the electrolyte, wherein
the step of preparing a liquid mixture includes
a sub-step of polymerizing a precursor of the conjugated polymer in a presence of the first polymer dopant and an oxidizing agent, to obtain a first mixture containing the conjugated polymer and the first polymer dopant, and
a sub-step of further mixing the lithium ion with the first mixture, to prepare the liquid mixture as a second mixture.

10. The method for producing an electrolytic capacitor according to claim 9, wherein the lithium ion is mixed in a form of a salt of a second polymer dopant having an anionic group and the lithium ion, with the first mixture.

11. The method for producing an electrolytic capacitor according to claim 9, wherein the polymerization of the precursor is performed in an absence of the lithium ion.

* * * * *